United States Patent
Kubo et al.

(10) Patent No.: US 6,181,656 B1
(45) Date of Patent: *Jan. 30, 2001

(54) RECORDING AND/OR REPRODUCING APPARATUS DISPLAYING IDENTIFICATION INFORMATION

(75) Inventors: Ryoji Kubo, Tokyo; Masaki Okada, Kawasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/310,107

(22) Filed: Sep. 22, 1994

Related U.S. Application Data

(63) Continuation of application No. 08/013,222, filed on Feb. 1, 1993, now abandoned, which is a continuation of application No. 07/544,622, filed on Jun. 27, 1990, now abandoned.

(30) Foreign Application Priority Data

Jul. 3, 1989  (JP) ................................... 1-171651
Jul. 6, 1989  (JP) ................................... 1-174965

(51) Int. Cl.$^7$ .............................. G11B 3/90; H04N 5/76
(52) U.S. Cl. .................................. 369/54; 358/909.1
(58) Field of Search .................... 358/43.1, 342, 358/906, 909, 335, 909.1; 369/54, 58

(56) References Cited

U.S. PATENT DOCUMENTS

| 4,059,955 | * | 11/1977 | Prak ...................................... 368/188 |
| 4,742,369 | * | 5/1988 | Ishii et al. ............................. 358/906 |
| 4,814,811 | * | 3/1989 | Saito et al. ............................ 358/909 |
| 4,858,031 | * | 8/1989 | Fukuta .................................. 358/342 |
| 4,887,161 | * | 12/1989 | Watanabe et al. .................... 358/909 |
| 4,982,291 | * | 1/1991 | Kurahashi et al. ................... 358/335 |

FOREIGN PATENT DOCUMENTS

| 57-38394 | 7/1982 | (JP) . |
| 60-159592 | 10/1985 | (JP) . |
| 62-272237 | 11/1987 | (JP) . |
| 63-7587 | 1/1988 | (JP) . |
| 63-184985 | 7/1988 | (JP) . |
| 62-224009 | 9/1988 | (JP) . |

* cited by examiner

Primary Examiner—Paul W. Huber
(74) Attorney, Agent, or Firm—Fitzpatrick, Cella, Harper & Scinto

(57) ABSTRACT

A recording apparatus for recording identification data of a predetermined number of digits for identifying recording data on a recording medium together with the recording data, including a display unit having a display capacity of a number of digits less than the predetermined number of digits for indicating the identification data, and an operation switch unit. Information Identification data to be displayed on the display unit is circularly designated, and the identification data is set and changed. A reproducing apparatus includes a reproducing unit for reproducing an image signal recorded together with an ID signal representing an attribute at each access position of a medium, a display unit capable of displaying characters or numerals, and a control unit for causing the display unit to display an access position of the reproducing unit upon access of the reproducing unit, and causing the display unit to display the ID signal when a predetermined designation is made.

5 Claims, 8 Drawing Sheets

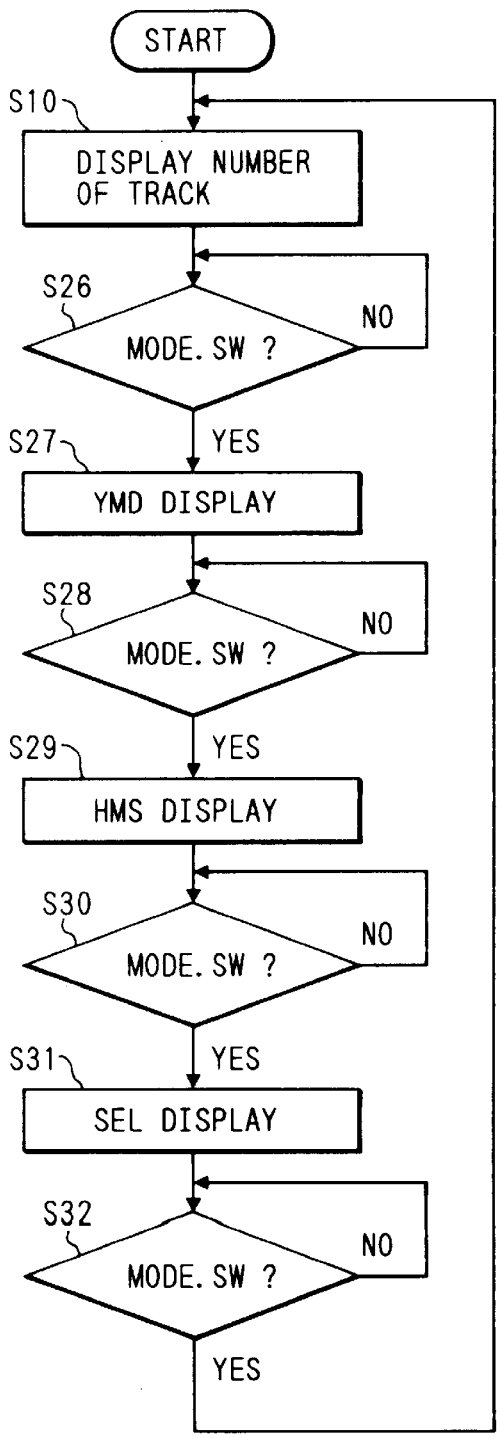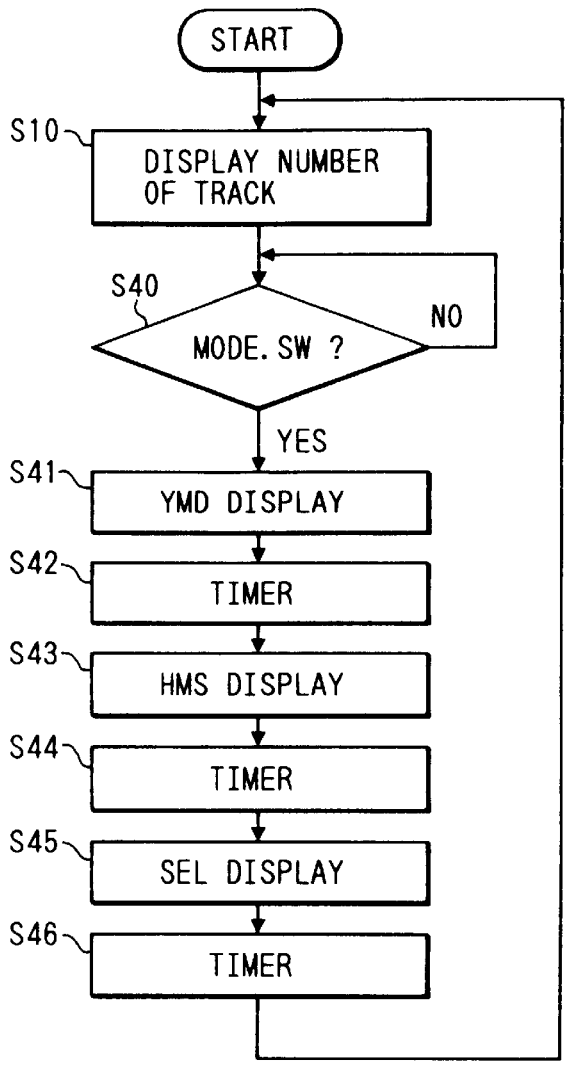

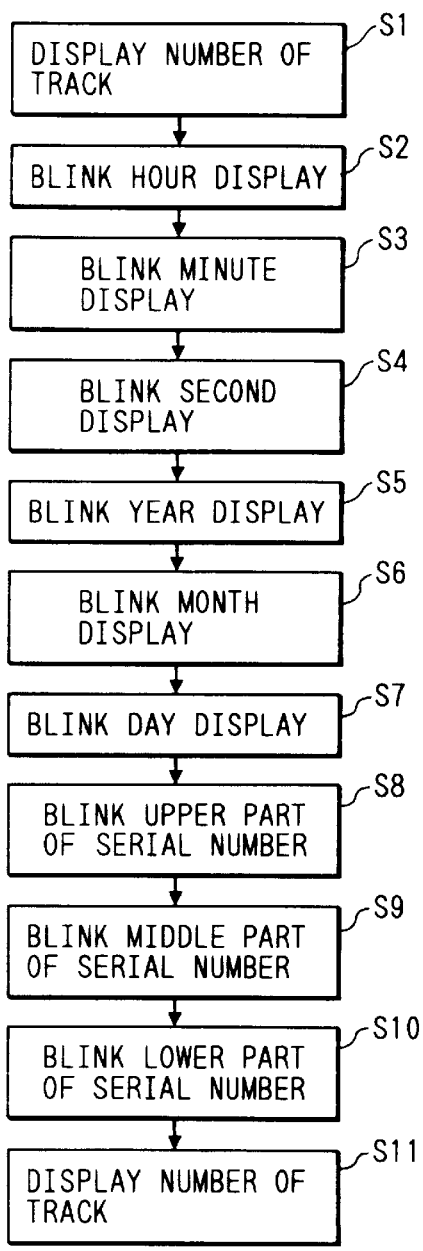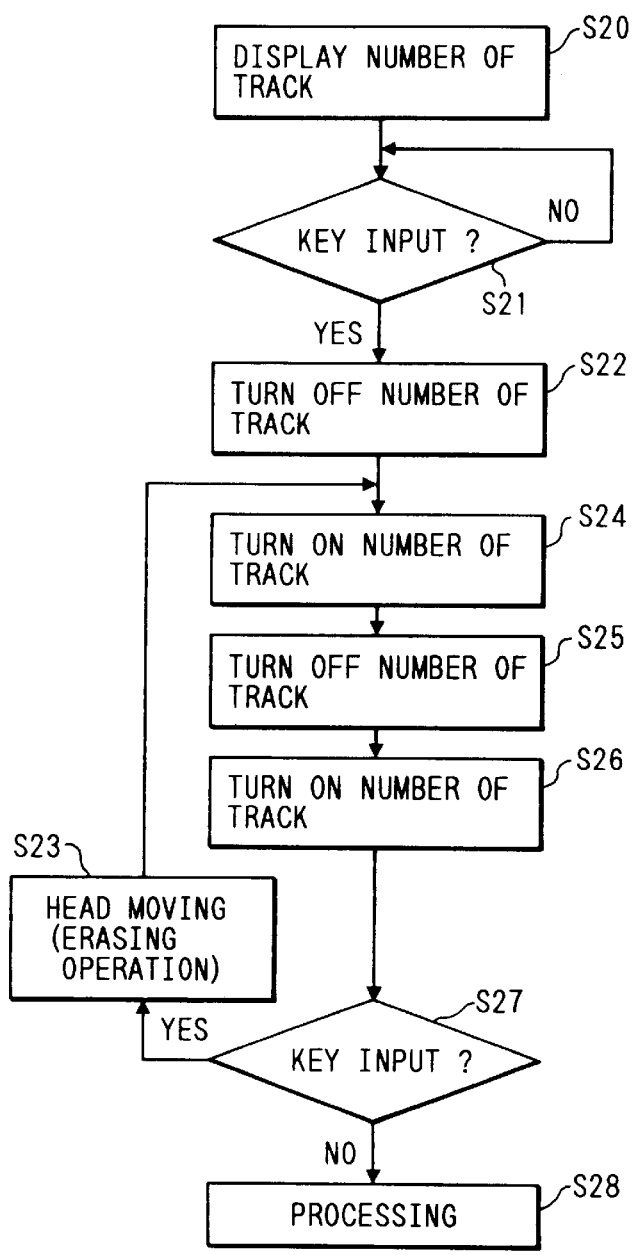

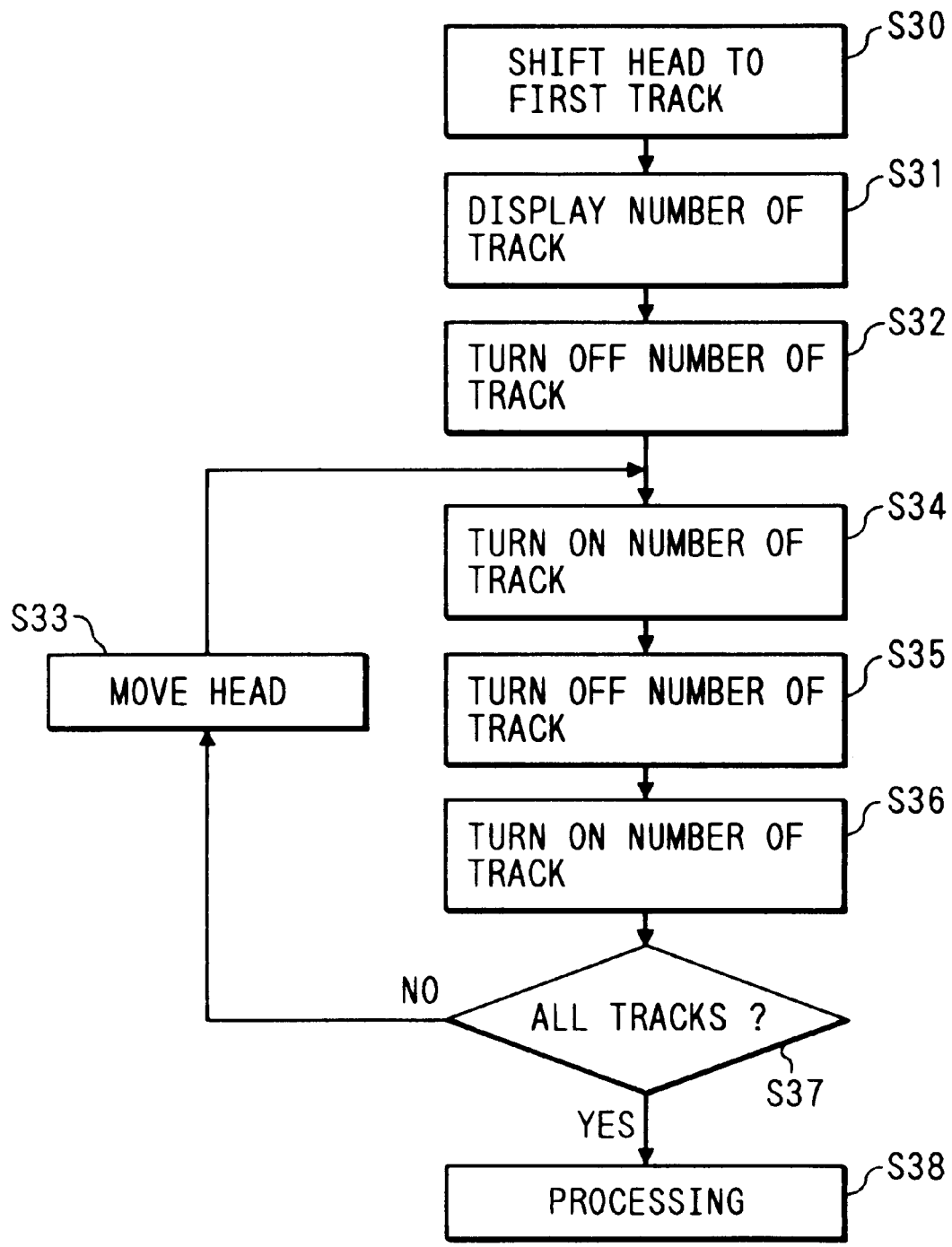

RECORDING AND/OR REPRODUCING APPARATUS DISPLAYING IDENTIFICATION INFORMATION

This application is a continuation of application Ser. No. 08/013,222 filed Feb. 1, 1993 now abandoned, which is a continuation of Ser. No. 07/544,622, filed Jun. 27, 1990, both now abandoned.

BACKGROUND OF THE INVENTION

1. Field of the Invention

The present invention relates to a reproducing apparatus and a recording apparatus and, more particularly, to a recording apparatus for recording an image signal on a recording medium and a reproducing apparatus for reproducing the recorded image signal.

2. Related Background Art

In a still video camera for recording an image signal picked up by an image pickup element onto a recording medium such as a magnetic sheet or a solid-state memory, when a photographed image is recorded on the recording medium, ID data such as a photographing date, time, serial number, and the like may be simultaneously recorded. When a signal is reproduced from the recorded recording medium, a still video reproducing apparatus separate from the camera may be used. Since the reproducing apparatus normally has a character generator, the ID data such as the photographing date, time, serial number, and the like can be confirmed on a monitor display.

In contrast to this, it is inconvenient to unload a recording medium and load it in the reproducing apparatus each time the content of the recording medium is to be confirmed. Thus, some cameras having reproducing functions have been proposed.

However, a character generator in such a camera would be expensive, and it would make the camera bulky.

When a camera is used outdoors, a TV monitor is not always present. Therefore, if a character generator is added to the camera, a reproduced image cannot be observed unless there is a TV monitor.

As a recording medium of a still image, a still video floppy disk standardized in a "Meeting of Still Video" is known, and as a recording apparatus, a still video camera is known. The still video floppy disk has 50 tracks, i.e., from an outermost first track to an innermost 50th track, and a video signal of one field can be recorded on each track. In order to record a video signal of one frame (two fields), two adjacent tracks are used. In the still video floppy disk, a recording format such as a date, time, track No., field/frame ID data, and user code is defined as identification data to be added to a still image to be recorded, i.e., ID data.

As a means for setting or inputting such ID data, a conventional still video camera employs a predetermined input means. The input means is operated while observing a 7-segment display device which is arranged on a camera body and allows a 6-digit display.

The segment display device of the 6-digit display is disadvantageous for a still video camera which aims at a compact and inexpensive design since it occupies a relatively large area and is expensive. When the number of display segments is increased, a display controller is complicated.

SUMMARY OF THE INVENTION

It is a first object of the present invention to provide a recording apparatus and/or a reproducing apparatus which can solve the above problem and is easy to use.

It is another object of the present invention to provide a recording apparatus which can display and record various data by a simple arrangement.

It is still another object of the present invention to provide a recording apparatus which causes a display device having a predetermined number of digits of display segments to display various data.

It is still another object of the present invention to provide a recording apparatus which can set ID data to be recorded together with an image signal by a simple arrangement.

In order to achieve the above objects, according to the preferred embodiments of the present invention, there is disclosed a recording apparatus for recording identification data of a predetermined number of digits for identifying recording data on a recording medium together with the recording data, comprising display means having a display capacity of a number of digits less than the predetermined number of digits for indicating the identification data, and operation switch means, wherein data to be displayed on the display means is circularly designated, and the identification data is set and changed.

It is still another object of the present invention to provide a reproducing apparatus which can display and reproduce various data by a simple arrangement.

It is still another object of the present invention to provide a reproducing apparatus which can display various data on a display device having display segments of a predetermined number of digits.

In order to achieve the above objects, according to another preferred embodiment of the present invention, there is disclosed a reproducing apparatus comprising reproducing means for reproducing an image signal recorded together with an ID signal representing an attribute at each access position of a medium, display means capable of displaying characters or numerals, and control means for causing the display means to display an access position of the reproducing means upon access of the reproducing means, and causing the display means to display the ID signal when a predetermined designation is made.

Other objects and features of the present invention will be apparent from the following description of the embodiments and drawings.

BRIEF DESCRIPTION OF THE DRAWINGS

FIGS. 2, 3, 4, 5, 6, and 7 are flow charts showing a display method using a liquid crystal display device 32;

FIG. 9 is a flow chart showing the display control of a display device 144 in an erase mode;

FIG. 10 is a flow chart showing the display control when a content recorded on each track is to be erased; and FIG. 11 is a flow chart showing the display control when recorded contents of all the tracks are to be erased.

DETAILED DESCRIPTION OF THE PREFERRED EMBODIMENTS

The first embodiment of the present invention will be described below with reference to the accompanying drawings.

Figure 1:
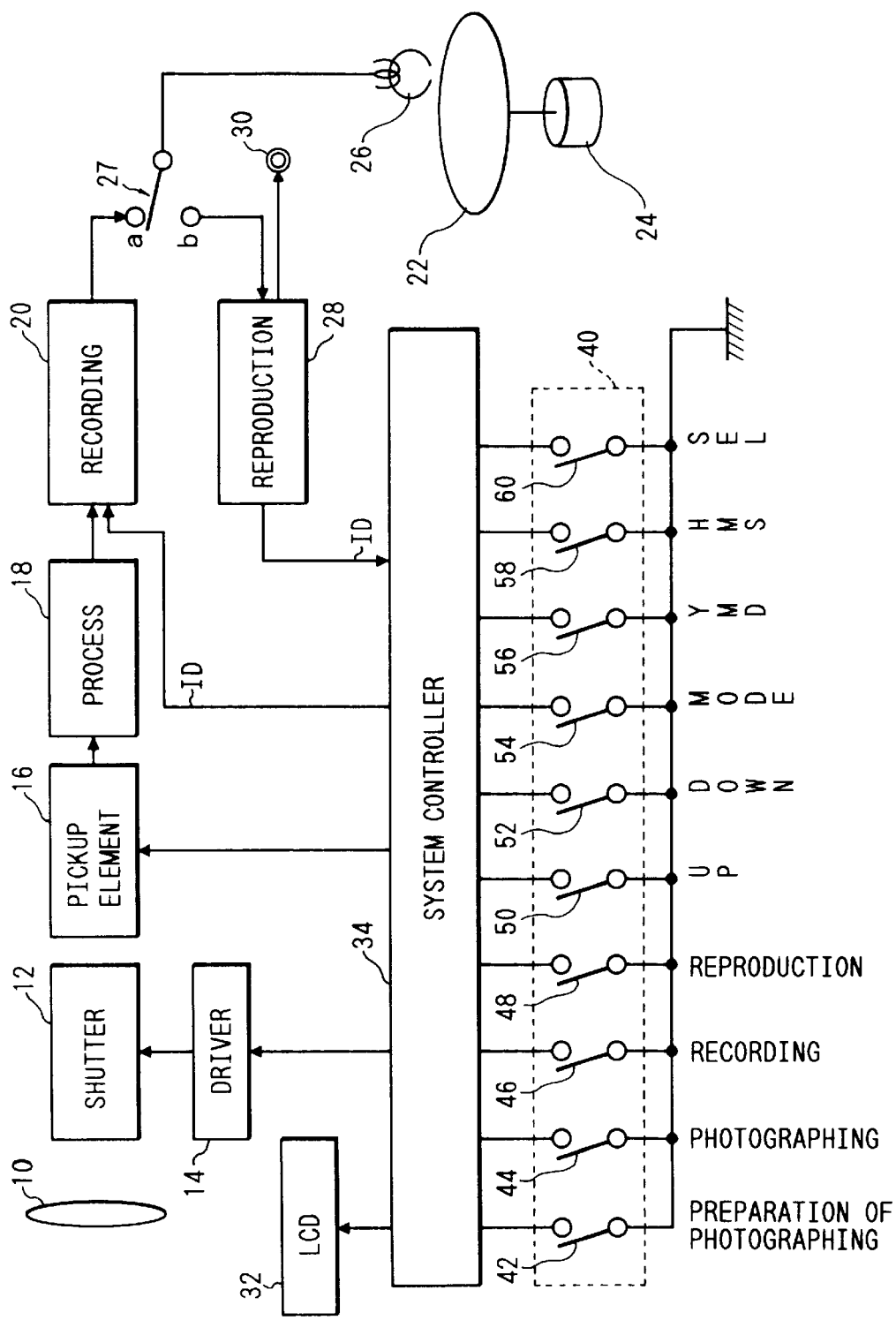
FIG. 1 is a block diagram showing an arrangement according to an embodiment of the present invention.

FIG. 1 is a block diagram showing an arrangement according to the first embodiment of the present invention.

A system shown in FIG. 1 includes a photographing lens 10, a mechanical shutter 12, a driver 14 for driving the shutter 12, an image pickup element 16, a process circuit 18 for forming a luminance signal and a color difference signal on the basis of an output from the pickup element 16, a recording circuit 20 for performing recording processing, e.g., modulation, of the luminance signal and the color difference signals output from the process circuit 18, a video floppy disk 22 as a recording medium, a motor 24 for rotating the floppy disk 22, a magnetic head 26, a switch 27 which is connected to a contact a in a recording mode, and is connected to a contact b in a reproducing mode, a reproducing circuit 28 for performing reproducing processing such as demodulation of a signal reproduced by a magnetic head 26, and outputting the processed signal as a video signal, a video output terminal 30, a liquid crystal display device (LCD) 32 for displaying a system state and various data, and a system controller 34 for controlling the entire system.

The system also includes a switch group 40 for inputting predetermined instructions to the system controller 34. The switch group 40 includes a photographing preparation switch 42 which is closed by the first stroke of a shutter release operation, and indicates the start of a photographing preparation operation, and a photographing switch 44 which is closed by the second stroke of the shutter release operation, and starts a photographing operation. The switch group 40 also includes a recording switch 46, a reproduction switch 48, an up switch 50 for beginning a track up operation, a down switch 52 for beginning a track down operation, a mode switch 54, a year, month, day (YMD) switch 56, an hour, minute, second (HMS) switch 58, and a serial number (SEL) switch 60.

A recording operation of the embodiment shown in FIG. 1 will be described below. Object light is incident on the pickup element 16 via the photographing lens 10 and the shutter 12. The pickup element 16 converts the input light into an electrical signal. The process circuit 18 converts the electrical signal into a luminance and color difference signals. The recording circuit 20 performs recording processing, e.g., modulation, of the luminance and color difference signals. ID data input in advance by the switch group 40 is supplied from the system controller 34 to the recording circuit 20. The recording circuit 20 outputs the ID data to the magnetic head 26 through the switch 27 together with the modulated image signal. As a result, the image signal and its ID data are magnetically recorded on a magnetic disk 22.

Figure 2:
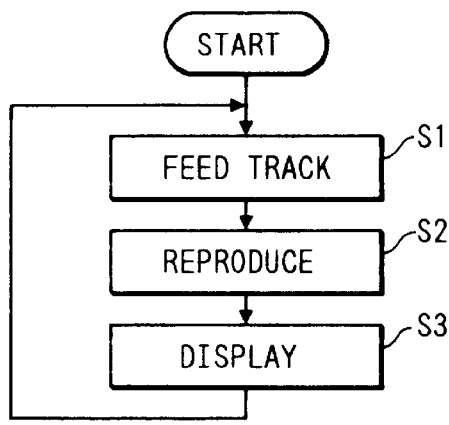

A reproducing operation shown in FIG. 2 will be described below. The magnetic head 26 is moved to a designated track position (S1), and a signal recorded on the track is reproduced by the reproducing circuit 28 (S 2). A video signal demodulated and reproduced by the reproducing circuit 28 is output to the video output terminal 30, and a demodulated ID signal is supplied to the system controller 34 (S2). The system controller 34 displays the content of the ID signal on the LCD 32 by a display method to be described later (S3). Thereafter, the track feed (S1), reproduction (S2), and display (S3) operations are repeated.

Figure 3:
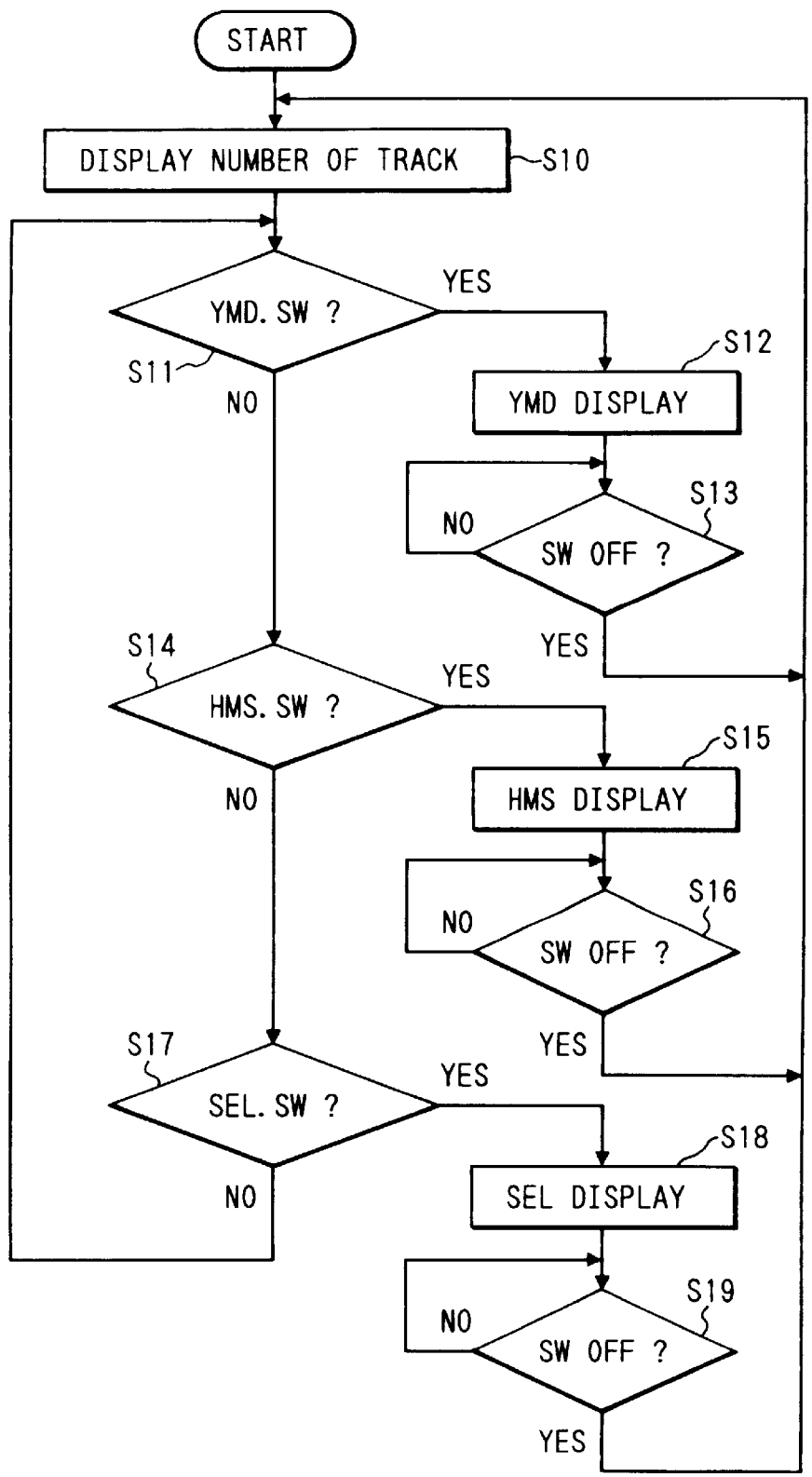

The display method of the LCD 32 will be described below. FIG. 3 is a flow chart showing the first embodiment of the display method. A number of a reproducing track is displayed (S10). The YMD switch 56, the HMS switch 58, and the SEL switch 60 are then checked. If input of the YMD switch 56 is detected (S11), year, month, and day data are displayed (S12). When the YMD switch 56 is turned off (S13), the number of the reproducing track is displayed again (S10). Similarly, when input of the HMS switch 58 is detected, hour, minute, and second data are displayed (S15). When HMS switch 58 is turned off (S16), the number of the reproducing track is displayed again (S10). When input of the SEL switch 60 is detected, serial number data is displayed (S18). When the SEL switch 60 is turned off (S19), the number of the reproducing track is displayed again (S10).

Figure 4:
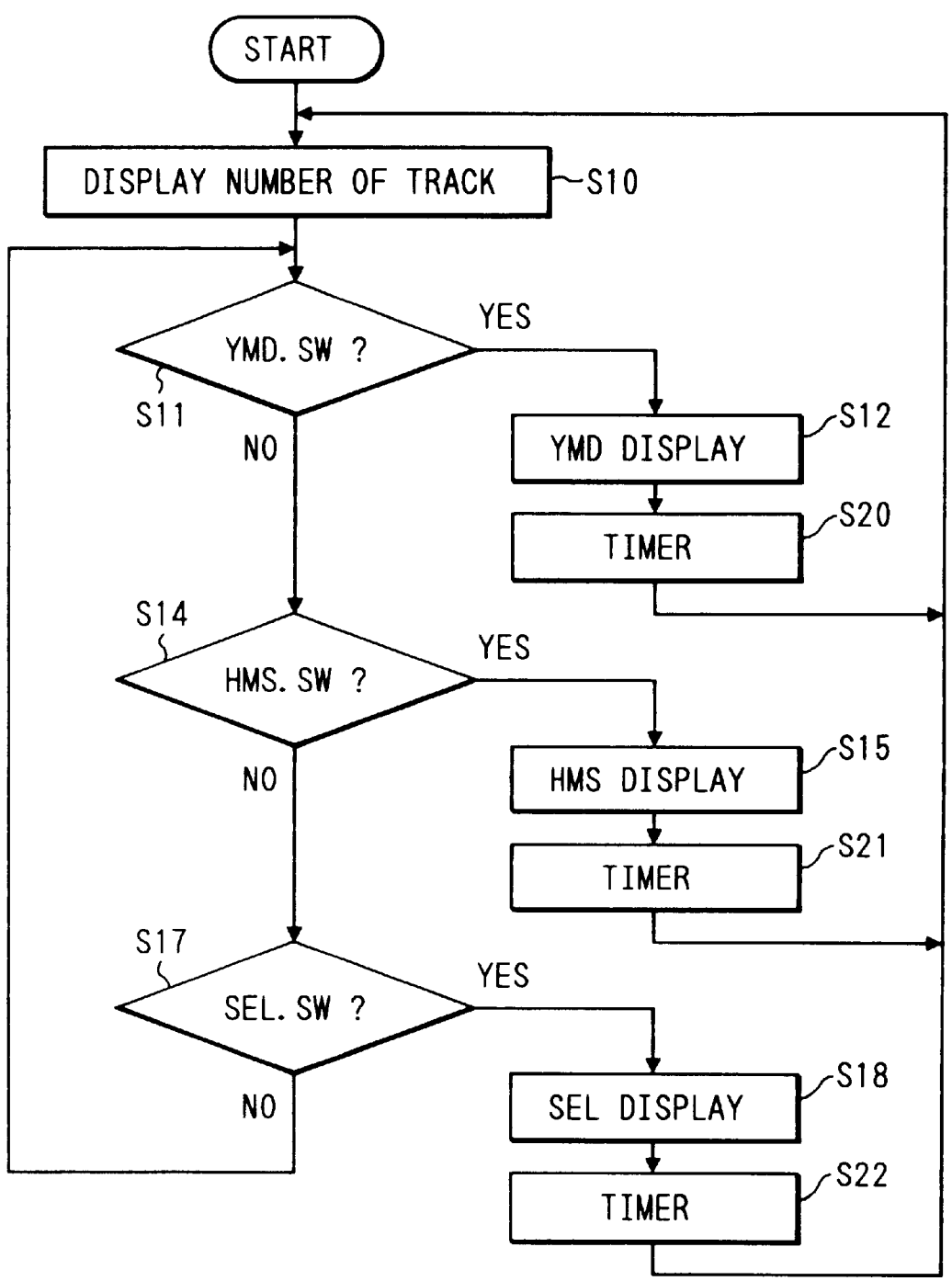

FIG. 4 is a flow chart showing the second display method. In this case, in place of the method shown in FIG. 3 wherein a display of the number of the reproducing track is resumed upon detection of the off event of the switch 56, 58, or 60 (S13, S16, S19), a display of the number of reproducing track (S10) is resumed when a predetermined period of time is measured by a timer (S20, S21, S22) after display of YMD, HMS, or SEL data.

Figure 5:
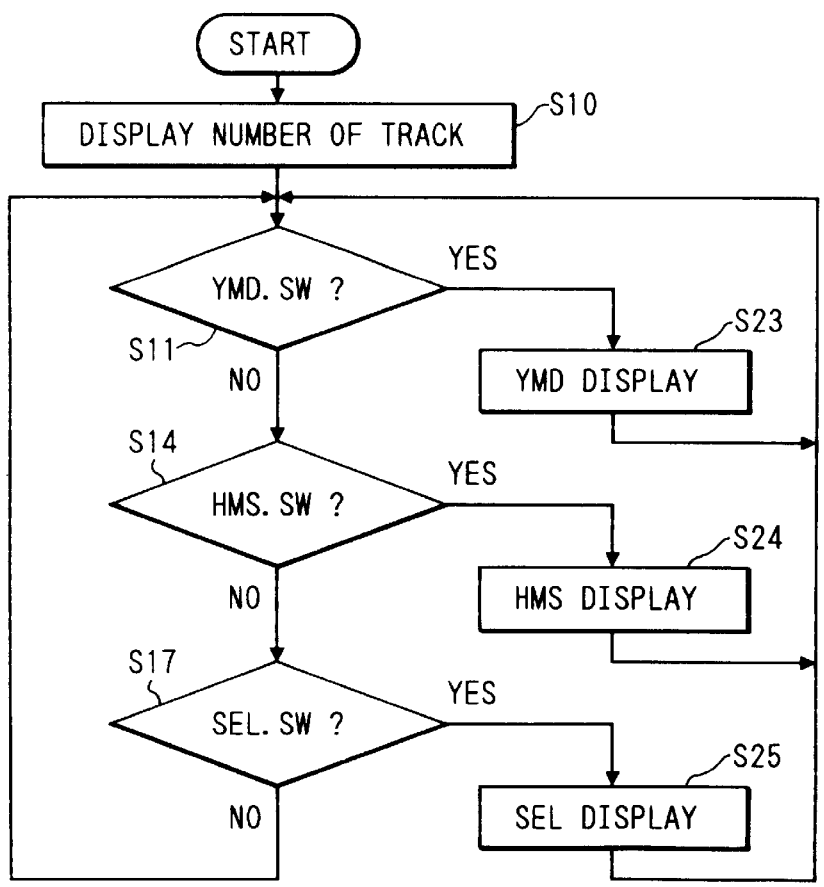

FIG. 5 is a flow chart showing the third display method. In this case, a corresponding display is made in response to input of the switch 56, 58, or 60 (S23, S24, S25), and thereafter, input of the switch 56, 58, or 60 is kept checked (S11, S14, S18).

FIG. 6 is a flow chart showing the fourth display method. In this case, after a display of the number of the reproducing track (S10), a YMD display (S27), an HMS display (S29), an SEL display (S31), and the display of the number of the reproducing track (S10) are circulated every time the mode switch 54 is depressed (S26, S28, S30, S32).

FIG. 7 is a flow chart showing the fifth display method. In this case, after a display of the number of the reproducing track (S10), input of the mode switch 54 is waited (S40), and thereafter, a YMD display (S41, S42), an HMS display (S43, S44), and an SEL display (S45, S46) are performed each for a predetermined timer time. Thereafter, the display of the number of the reproducing track (S10) is performed again, and input the mode switch 54 is then awaited (S40). In this case, in step S40, an input from the mode switch 54 need not be waited, but a timer for measuring a predetermined period of time may be started.

In this embodiment, the liquid crystal display device is used. However, the present invention is not limited to this. Data to be displayed are not limited to year, month, and day data, hour, minute, and second data, and serial number data. Other data such as a photographing condition may be displayed. Furthermore, the number of the reproducing track is always displayed. However, another display (e.g., year, month, and day) may be made.

The case has been exemplified wherein the still video floppy disk is used as an image recording medium. The recording medium may comprise a tape-like medium, an optical recording medium, a solid-state memory such as a semiconductor memory, or the like. An ID signal may be frequency-multiplexed with a video signal or may be time-divisionally recorded without being frequency-multiplexed. Data other than a video signal, e.g., an audio signal may be reproduced.

As can be easily understood from the above description, according to this embodiment, ID data such as date, time, or serial number can be displayed on a small display device, and information of a recording content of the recording medium can easily be obtained. If there is no TV monitor, retrieval based on ID data can be performed.

The second embodiment of the present invention will be described below.

Figure 8:
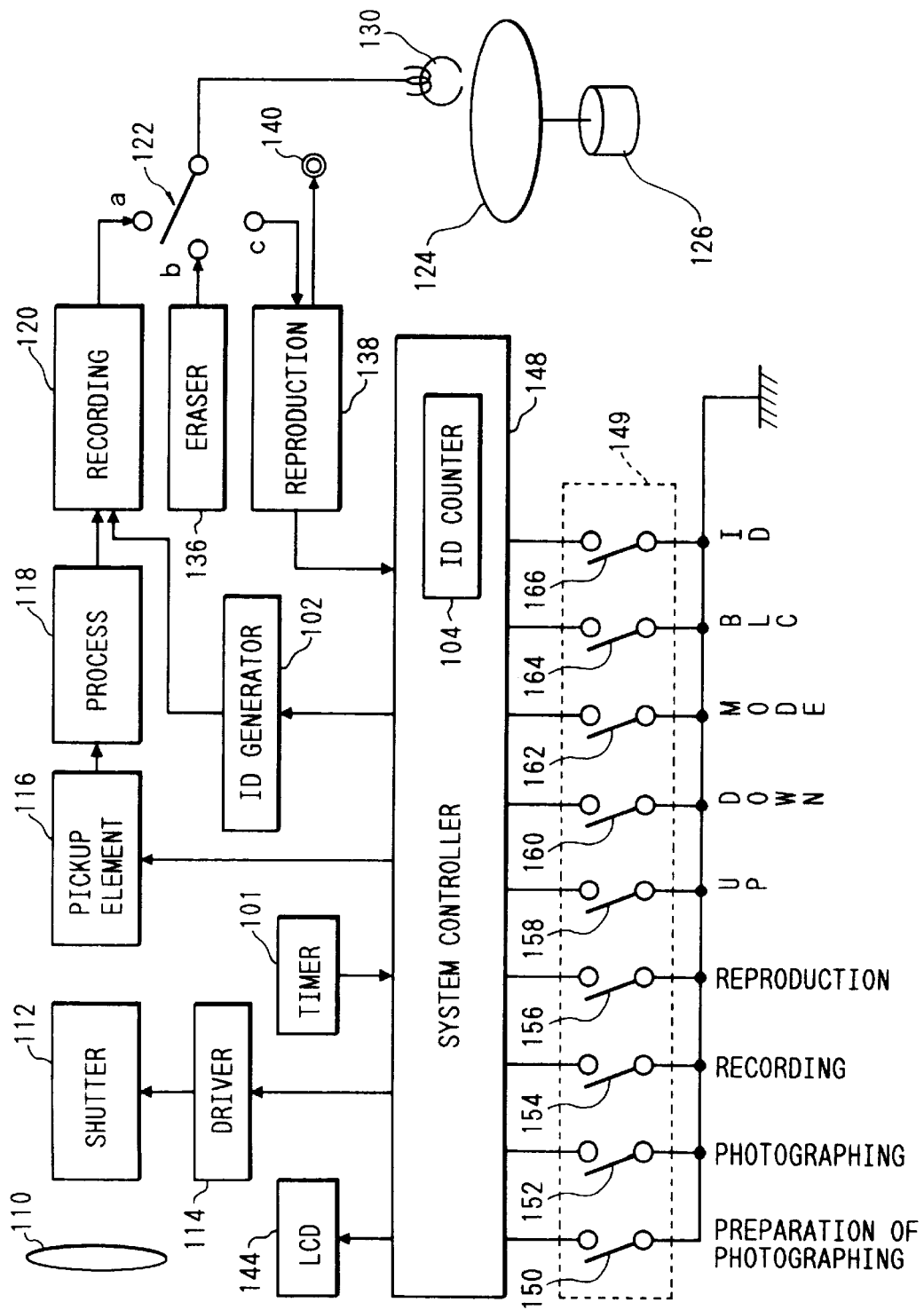
FIG. 8 is a block diagram showing an arrangement according to another embodiment of the present invention.

FIG. 8 is a block diagram showing an arrangement according to the second embodiment of the present invention. A system shown in FIG. 8 includes a photographing lens 110, a mechanical shutter 112, a driver 114 for driving the shutter 112, an image pickup element 116, a process circuit 118 for forming a luminance signal and color difference signals on the basis of an output from the pickup element 116, a recording circuit 120 for performing recording processing, e.g., modulation, of the luminance signal and the color difference signals output from the process circuit 118, a switch 122 for switching recording, erase, and reproducing modes, a video floppy disk 124 as a recording medium, a motor 126 for rotating the floppy disk 124, a magnetic head 130, an erase circuit 136 for generating an erase signal, a reproducing circuit 138 for performing reproduction processing, e.g., demodulation, of a signal reproduced by the magnetic head 130, and outputting a video signal, and a video output terminal 140.

The system also includes a liquid crystal display device (LCD) 144 for displaying a system state, and various data. The LCD 144 has a numeric display capacity of two digits for displaying ID data. The system also includes a system controller 148 for controlling the entire system, and a switch group 149 for inputting predetermined instruction to the system controller 148. The switch group 149 includes a photographing preparation switch 150 which is closed by the first stroke of a shutter release operation, and indicates the start of a photographing preparation operation, and a photographing switch 152 which is closed by the second stroke of the shutter release operation, and starts a photographing operation. In addition, the switch group 149 includes a recording switch 154, a reproduction switch 156, an up switch 158 for beginning a track up operation, a down switch 160 for instructing a track down operation, a mode switch 162 for switching a display mode of the LCD 144 and switching a setting mode, a BLC switch 164, and an ID switch 166.

The system also includes a timer circuit 101 for generating date.time data, a modulation circuit 102 for DPSK-modulating the date.time data output from the timer circuit 101 as ID data, and a counter 104 for counting a serial number of four digits to be recorded as ID data. The counter 104 is incremented every time a photographing operation is performed.

An operation of the embodiment with the arrangement shown in FIG. 8 in a recording mode will be briefly described below. An optical image of an object is converted into an electrical signal by the pickup element 116, and the process circuit 118 outputs a luminance signal and color difference signals. The recording circuit 120 performs processing for recording, e.g., modulation, of the luminance and color difference signals from the process circuit 118. The system controller 148 supplies ID data input at the switch group 149 and displayed on the LCD 144 to the recording circuit 120. The recording circuit 120 also performs processing for recording, e.g., modulation, of the input ID data, and outputs the modulated data to multiplex it on a signal from the process circuit 118. This output is applied to the magnetic head 130 via the switch 122, and is recorded on the floppy disk 124.

An input operation of ID data and an operation of the LCD 144 at that time will be described below with reference to FIG. 9. The LCD 144 normally displays one of the numbers of tracks 1 to 50. When the system controller 148 detects an operation of the ID switch 166, it is set in an ID setup mode, and controls the display mode of the LCD 144 as follows. More specifically, when the ID switch 166 is turned on, the present display of the number of the track (S1) is switched to an "hour" blink display (S2). An "hour" display value can be incremented/decremented by the up and down switches 158 and 160 of the switch group 149. When the ID switch 166 is turned on again, a "minute" blink display is performed (S3), and a "minute" display value can be incremented/decremented by the up and down switches 158 and 160 of the switch group 149. When the ID switch 166 is turned on again, a "second" blink display is performed (S4), and a "second" display value can be reset to "00" by the up and down switches 158 and 160 of the switch group 149.

Similarly, every time the ID switch 166 is input, a year display (S5), a month display (S6), a day display (S7), a serial number upper part display (S8), a middle part display (S9), and a lower part display (S10) are made by a two-digit blink display. Each display value can be incremented/decremented by the up and down switches 158 and 160 of the switch group 149.

The blink display of the ID data in the ID setup mode (S2 to S10) is realized by repetitively turned on and off ID data. In place of turning off ID data, a specific segment may be turned on. The setup order and items in the ID setup mode are not limited to those in FIG. 9.

A method of erasing a video signal recorded on the floppy disk 124 will be described below. In this embodiment, when a shutter release operation is performed while the mode switch 162 is kept depressed, i.e., when the mode switch 162 and the photographing switch 152 are simultaneously depressed, an erase current of the erasing circuit 136 is applied to the magnetic head 130.

When the reproduction switch 156 of the switch group 149 is depressed, a reproduction mode is set. In this state, the magnetic head 130 is moved to a target track position (a position of a track to be erased) by the up and down switches 158 and 160, and the track is reproduced. When the mode switch 162 and the photographing switch 152 are simultaneously depressed, the switch 122 is connected to the contact b, and an erase current of the erase circuit 136 is applied to the magnetic head 130, thus erasing the recording content of the corresponding track.

FIG. 10 is a flow chart showing an operation of the LCD 144 at that time. During reproduction of the floppy disk 124, the LCD 144 displays the number of track (S20). When the mode switch 162 and the photographing switch 152 are simultaneously depressed (S21), the LCD 144 turns off the displayed number of track for a predetermined period of time (S22), then turns on (S24), off (S25), and on (S26) the number of track at predetermined time intervals, and erases the recording content of the track.

Thereafter, when it is confirmed that simultaneous input of the mode switch 162 and the photographing switch 152 is continued (S27), the magnetic head is moved to the next track (S23), and steps S24 to S26 are repeated to erase the recording content of the track. When simultaneous input is not continued, the erase operation is ended, and the next processing is started (S28).

As described above, a recording content of an arbitrary one track or a plurality of arbitrary tracks continuous with the arbitrary one track can be erased.

A display mode of the LCD when contents of all the tracks are erased will be described below with reference to FIG. 11. When the photographing switch 152, the mode switch 162, and the BLC switch 164 are simultaneously depressed during reproduction of any track, the magnetic head 130 is moved to the first track position (S30), and the LCD 144 displays the number of the track, i.e., "1" (S31). The LCD turns off the displayed number of the track for a predetermined period of time (S32), then turns on (S34), off (S35), and on (S36) the number of the track at predetermined time intervals, and erases the recording content of the track. Thereafter, the magnetic head 130 is moved to the next track (S33), and a blink display and an erase operation in steps S34 to S36 are executed. In this manner, the blink display and erase operation of the number of track for all the 50 tracks are performed (S37). After the contents of all the tracks are erased, the next processing is started (S38).

In this embodiment, the contents of all the tracks are erased from the first track to the 50th track in turn. Alternatively, the contents of the tracks may be erased in the order opposite to that described above, i.e., from the 50th track to the first track.

The switches for instruction various operations are not limited to those in the above embodiment. In this embodiment, one instruction input requires a plurality of switches. However, the present invention is not limited to this. For example, an instruction may be input by another combination of switches or by another one switch operation. The liquid crystal display device has been exemplified as a display device. However, other display devices may be employed, and the number of display digits is not limited to two.

In this embodiment, the still video floppy disk is used as an image recording medium. The recording medium may comprise a tape-like medium, an optical recording medium, a solid-state memory such as a semiconductor memory, or the like. An ID signal may be data which is frequency-multiplexed with a video signal and is recorded or data which is time-divisionally recorded without being frequency-multiplexed. Data other than a video signal, e.g., an audio signal may be reproduced.

As can be understood from the above description, according to this embodiment, the number of display digits of an ID data display can be small, and a compact, inexpensive display device can be used.

Various changes and modifications may be made within the scope of the appended claims.

What is claimed is:

1. A reproducing apparatus for reproducing an image information signal from a recording medium on which is stored at least one image information signal, serial number information peculiar to the image information signal, and date/time information given to the image information signal, said apparatus comprising:

selection means for selecting the image information signal to be reproduced from among the at least one image information signal stored on the recording medium;

read-out means for reading out, form the recording medium, the selected image information signal, the serial number information peculiar to the selected image information signal, and the date/time information given to the selected image information signal;

acceptance means for accepting a selection by an operator of a kind of information to be displayed on a display device from among the serial number information peculiar to the selected image information signal and the date/time information given to the selected image information signal; and cancellation means for canceling, when a predetermined time has elapsed, the display on the display device of the information corresponding to the selection accepted by said acceptance means.

2. A reproducing apparatus according to claim 1, wherein said recording medium is disk-shaped.

3. A reproducing apparatus according to claim 1, wherein said selection means selects in accordance with a manual instruction.

4. A reproducing apparatus according to claim 1, further comprising timer means for measuring said predetermined time.

5. A reproducing means according to claim 1, further comprising said display device.

* * * * *

UNITED STATES PATENT AND TRADEMARK OFFICE
CERTIFICATE OF CORRECTION

PATENT NO. : 6,181,656 B1  Page 1 of 1
DATED : January 30, 2001
INVENTOR(S) : Ryoji Kubo et al.

It is certified that error appears in the above-identified patent and that said Letters Patent is hereby corrected as shown below:

Title page,
Item [56], References Cited, FOREIGN PATENT DOCUMENTS,
"62-224009" should read -- 63-224009 --.
Item [57], ABSTRACT,
Line 7, "Information" should be deleted.

Column 1,
Line 23, "recorded" should be deleted.

Column 3,
Line 51, "(S 2)" should read -- (S2) --.

Column 4,
Line 30, "waited" should read -- awaited --.
Line 35, "and input" should read -- and an input from --.
Line 37, "waited," should read -- awaited --.

Column 8,
Line 12, "form" should read -- from --.
Line 36, "reproducing means" should read -- reproducing apparatus --.

Signed and Sealed this

Sixteenth Day of May, 2006

JON W. DUDAS
*Director of the United States Patent and Trademark Office*